Feb. 17, 1959 A. B. NEWTON 2,874,345
INDUCTION MOTOR SPEED CONTROL
Filed June 24, 1957 2 Sheets-Sheet 1
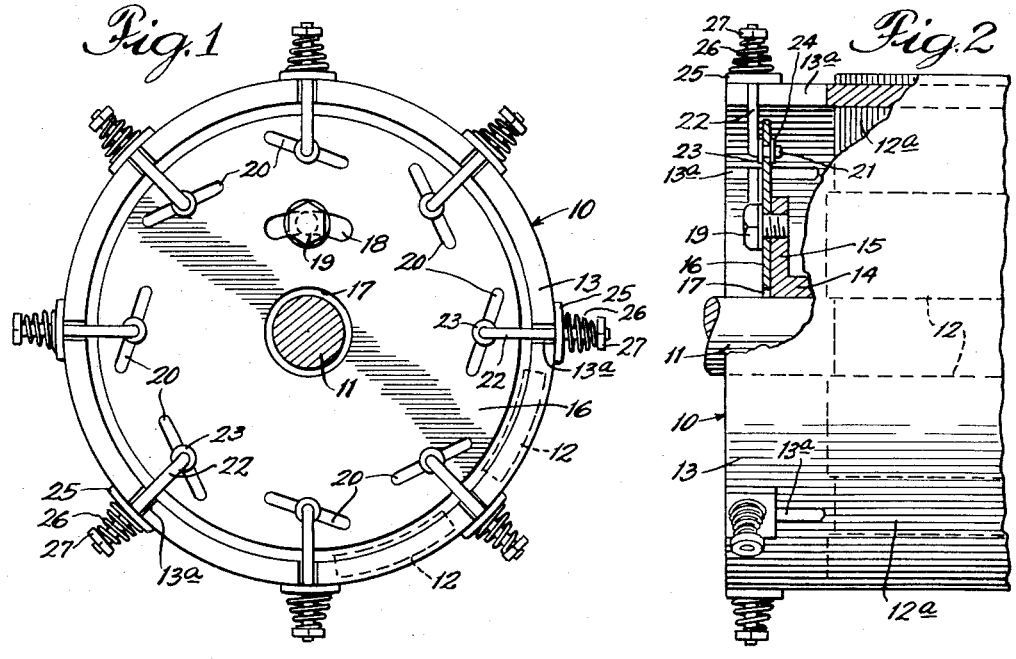
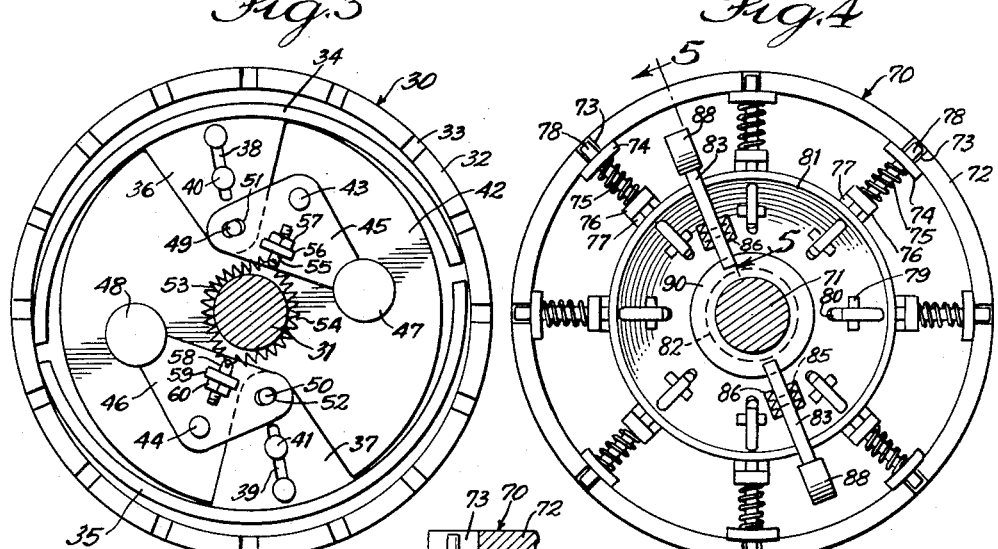
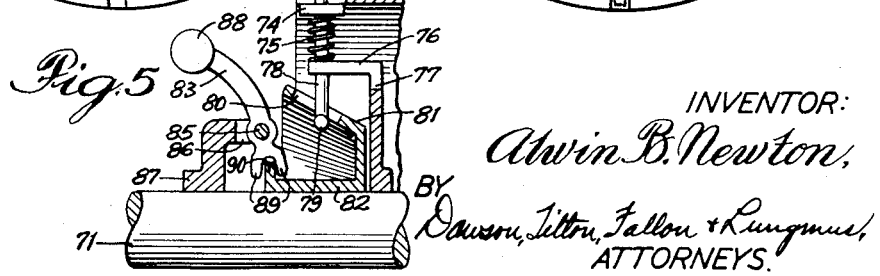
INVENTOR:
Alwin B. Newton,
BY
Dawson, Tilton, Fallon & Lungmus,
ATTORNEYS.

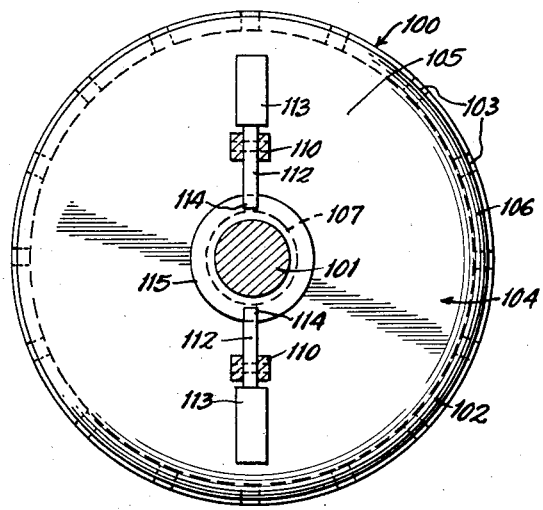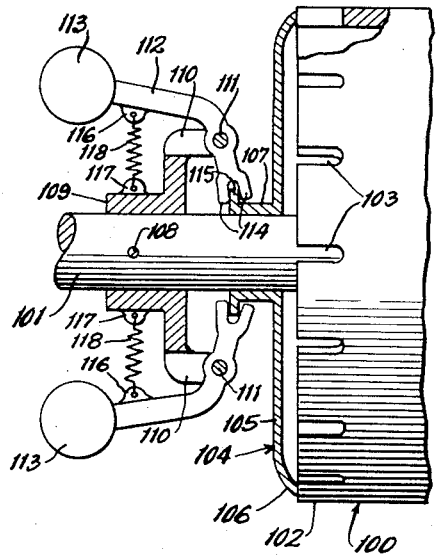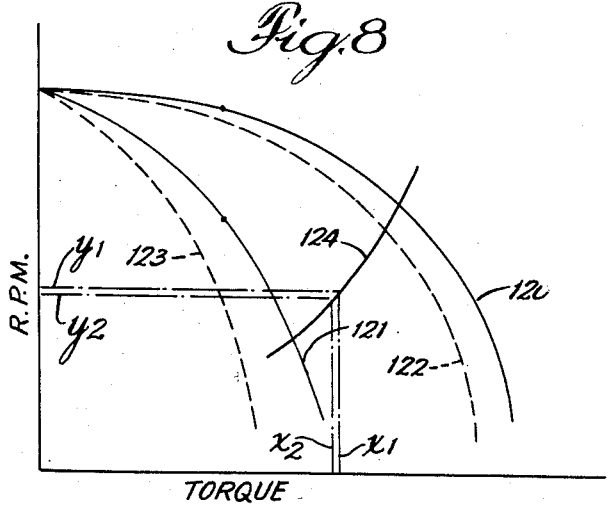

United States Patent Office 2,874,345
Patented Feb. 17, 1959

2,874,345

INDUCTION MOTOR SPEED CONTROL

Alwin B. Newton, Wichita, Kans., assignor to The Coleman Company, Inc., Wichita, Kans., a corporation of Kansas Application June 24, 1957, Serial No. 667,553

11 Claims. (Cl. 318—232)

This invention relates to alternating current motors, and especially to induction motors. More particularly, the invention is concerned with controlling the speed of induction motors whereby a relatively constant operating speed is provided irrespective of voltage disturbances in the supply lines therefor or in variations of torque requirements imposed upon the motor by its load within prescribed limits.

The use of direct drive blowers in air conditioning and heating equipment has increased the importance of small electric motors in respect to control of the speed thereof, and also with respect to the variability of the speed thereof. Today, speed control is accomplished in such blowers by using permanent split capacitor motors or shaded pole motors, since such motors are voltage-sensitive. An adjustment thereof to various speed requirements may be accomplished by varying the voltage supplied thereto by means of a reactor or an auto-transformer. It is apparent that since the speed of such motors can be controlled by changing the value of the voltage supply therefor, these motors are of necessity voltage-sensitive and any disturbances or changes in the value of the voltage supply will have an immediate effect on the speeds at which the blowers operate. This, of course, is a disadvantage.

Conceivably, such results could be avoided by using a voltage-sensitive motor equipped with a governor functional to open and close the motor supply circuit as the speed of the motor begins to vary from a predetermined value. This would tend to stabilize the motor speed, but because the contacts that would be opened and closed by the governor would have high voltage thereacross, considerable interference would be experienced in closely located electrical appliances (such as radio and television receivers); and further, the high voltage would cause rapid deterioration of the contacts. It would be appreciated also that a substantial problem is presented of providing an acceptable means for transferring the motion from a rotating element to a fixed set of contacts. Therefore, such a system also has considerable inherent disadvantages.

An object of this invention is to provide an improved means for controlling the speed of an alternating current motor whereby the disadvantages inherent in other speed control systems are overcome. Another object of the invention is to provide a system for controlling the speed of an induction motor by selectively changing the resistance of the rotor thereof to make the motor selectively voltage-sensitive and non-voltage-sensitive or, stated another way, to provide a system for controlling the speed of an induction motor wherein for any given voltage, the motor is alternately made more or less sensitive to torque variations with respect to speed.

Still another object is to provide a system in combination with an induction motor whereby at some predetermined speed the resistance of the rotor is changed preferably by a governor, the resistance being decreased when the motor speed falls below such predetermined speed, whereby the motor is less voltage-sensitive, and vice versa. A further object of the invention is to provide an induction motor wherein the rotor has a winding cast therein providing conductor bars and a slotted conductor ring shorting the conductor bars and in which a governor mechanism is carried by the rotor and is operative to selectively short across the slots in the shorting ring whenever the speed drops below a predetermined value, thus giving a low resistance to the rotor, but which removes the shorts across the slots in the coupling ring whenever the motor speed reaches or exceeds a predetermined value thereby restoring full resistance to the rotor and causing it to slow down somewhat if the load on the motor is not changed. This alternate action of shorting the rotor and restoring its normal resistance will occur at a speed change dependent upon the sensitivity of the governor, thereby permitting adjustment for any desired operating speed and for any desired sensitivity. Additional objects and advantages will appear as the specification develops.

Embodiments of the invention are illustrated in the accompanying drawings, in which—

Fig. 1 is an end view in elevation of an inductance motor rotor embodying the invention; Fig. 2 is a partial vertical sectional view of the rotor; Fig. 3 is a front view in elevation of a rotor embodying a modified form of the invention; Fig. 4 is a front view in elevation of a further modification; Fig. 5 is a broken transverse sectional view of the modification shown in Fig. 4, and being taken along the line 5—5 thereof; Fig. 6 is a front view in elevation of an induction motor rotor showing still another modified form of the invention; Fig. 7 is a broken longitudinal sectional view of the form of structure shown in Fig. 6; and Fig. 8 is a graph wherein motor torque is plotted against motor speed.

The rotor illustrated in Figs. 1 and 2 is designated generally with the numeral 10, and as has been brought out hereinbefore is adapted for use with an induction motor, and for simplicity the stator of such a motor is not illustrated. The rotor is equipped with a shaft 11 that defines a rotational axis thereof, and that shaft, as is well understood, will be rotatably supported in bearings provided by the stator assembly and when the induction motor is assembled. In accordance with conventional practices in the manufacture of inductance motor rotors, the one illustrated in Figs. 1 and 2 has a winding cast therein, and this winding has a plurality of bars or conductors 12 suitably separated from each other by laminations 12a.

It is to be appreciated that conventionally a larger number of rotor bars or conductors 12 are provided than is shown in Fig. 2. The rotor bars or conductors 12 are electrically coupled by a continuous shorting ring 13 (best seen in the lower half of Fig. 2). In the illustration given shorting ring 13 is provided with a plurality of slots 13a which extend partway therethrough, providing portions of less cross-sectional area, and greater resistance. The rotor illustrated is conventional in that it possesses continuous ring-shaped shorting rings ordinarily provided in induction motors to terminate and connect the rotor bars. Preferably, in the illustration given, the slots 13a are cut partway through ring 13 at points between the bars 12 passing through the rotor. As a result high resistance to current flow through rings 13 occurs in the area of the slots whenever they are not shorted out by other means.

The rotor may be considered a high resistance rotor for the resistance thereof is purposely established at a value above what would be employed if a constant speed were desired for the induction motor using this rotor.

The reasons for this will be brought out in greater detail hereinafter, but from what has been set forth about it will be understood that the speed for this rotor is not constant and the resistance thereof is selectively varied between high and low values.

Rigidly secured to the shaft 11 by a set screw, a press fit or other suitable means, is a mounting or support member 14 having a laterally extending flange 15. In facing relation with the flange 15 is a governor adjusting plate 16 having an enlarged central opening 17 that spaces that same from the shaft 11, and an arcuate slot 18 spaced laterally of the central opening. The plate 16 is adjustably secured to the flange 15 by means of a cap screw 19 that extends freely through the elongated arcuate slot 18 and is threadedly received within the flange 15. The plate 16 is pivotal with respect to the shaft 11 and flange 15 within the limits defined by the arcuate slot 18 and the cap screw 19.

As is seen most clearly in Fig. 1, the plate 16 is provided with a plurality of spaced apart cam slots 20 that are angularly oriented with respect to radii of the annular plate 16 and of the shaft 11 which is coaxial therewith. In being so oriented, each slot 20 has one end that lies in close proximity with the outer edge of the plate 16, and another end that is inwardly thereof. There is a slot 20 for each of the channels or spaces 13a.

Slidably carried in each of the slots 20 is a laterally turned end 21 of pin 22 that extends outwardly of the plate 16 through a slot 13a in ring 13. The ends 21 are anchored within the slots by means of clamp collars or washers 23 and 24 on opposite sides of the plate 16, and of which at least the washer 24 is secured to the end 21. Slidably mounted on each of the rods or pins 22 for longitudinal movement thereon, is a shorting bar 25 normally biased into engagement with the ring 13 on each side of the slots 13a by means of a coil spring 26 that seats thereagainst at one end, and that at its opposite end seats on a washer or stop member 27 secured to the pin 22 adjacent the outer end thereof.

The shorting members 25 are preferably formed from a good conducting material, and are adapted to establish a good electrical contact between portions of ring 13 so as to effectively short across the slots 13a. As the rotor 10 rotates about the longitudinal axis of the shaft 11, centrifugal force developed by the shorting bars 25 tends to move those bars outwardly along the pins 22. It is clear that at some predetermined speed, the centrifugal force will be of sufficient magnitude so as to overcome the biasing force of the springs 26, and at such time the shorting members 25 will move away from the ring 13 and in interrupting the electrical connection therebetween will no longer short across the slots 13a. When the speed of the rotor falls below such predetermined value, the biasing force of the springs 26 will overcome the centrifugal force and will cause the shorting members 25 to again short over the slots 13a.

It is to be appreciated that the shorting bars 25 are in reality low resistance shunts for the relatively high resistance portion 13b of ring 13. Portion 13b is the small cross-sectional area portion in ring 13 provided by slots 13a. It is also to be appreciated that slots 13a could be extended completely through ring 13. In this instance when shorting members 25 are disengaged from ring 13, only eddy currents would produce torque in the rotor bars which would then be completely isolated from each other. The changes in current in such a case might be quite drastic and cause upsets in the transmission line feeding the motor.

The particular speed at which the shorting elements 25 move away from ring 13 will depend upon the strength of the springs 26. Further, the biasing force exerted by the springs may be varied by rotating the plate 16 with respect to the shaft 11 and flange 15. Such rotation is accomplished by loosening the cap screw 19 and again tightening it after the plate has been rotated. As viewed in Fig. 1, rotation of the plate 16 in a counter-clockwise direction with respect to the rotor and the shaft 11 thereof will increase the biasing force of the springs 26 by drawing the pins 22 inwardly toward the shaft 11. On the other hand, rotation of the plate in a clockwise direction will decrease the biasing force of the springs in that it permits the pins to move outwardly which allows for expansion of the springs.

The rotor embodying the modification illustrated in Fig. 3 is designated generally with the numeral 30, and is supported for rotation on a shaft 31. The rotor has cast therein a plurality of bars electrically separated from each other by gaps as specified above and coupled together by ring 32. The gaps or spaces 33 in ring 32 are adapted to be shorted across by internal shoes 34 and 35 supported interiorly of the bars 32 by ears 36 and 37, respectively, provided with elongated slots 38 and 39 extending along a diameter of the rotor that slidably receive pins 40 and 41, respectively, that permit the shoes to move along a diameter of the rotor, but which prevent displacement of the shoes in other directions. The pins 40 and 41 preferably have enlarged heads as shown, and the slots 38 and 39 have enlargements at their outer ends to permit insertion of the enlarged heads therethrough in mounting the shoes on the pins.

Rigidly secured to the shaft 31 to prevent relative rotation therebetween is a mounting plate 42 having stationary pins 43 and 44 extending forwardly therefrom along a diameter of the rotor displaced slightly from the diameter along which the pins 40 and 41 extend. Pivotally supported on the pins 43 and 44 are governor plates or leaves 45 and 46 equipped, respectively, at their outer ends with weights 47 and 48 displaced from the pivotal axes 43 and 44.

The leaves 45 and 46 at the ends thereof opposite the weights are pivotally connected, respectively, with the shoes 34 and 35 by means of pins 49 and 50 provided by the ears thereof which are loosely received in enlarged slots or openings 51 and 52 provided by the governor plates. With this arrangement, rotation of the rotor 30 tends to pivot the weights 47 and 48 outwardly about the respective axes 43 and 44 of the governor leaves, whereupon the opposite ends of those leaves which provide the enlarged slots 51 and 52 swing inwardly thereby pulling the pins 49 and 50 inwardly and, of course, the shorting shoes 34 and 35 affixed thereto. At some predetermined speed, the governor weights 47 and 48 will move outwardly to an extent sufficient to withdraw the shorting shoes from ring 32, as shown in Fig. 3. On the other hand, when the rotational speed of the rotor falls below such predetermined speed, the weights will move inwardly and the shorting shoes will be forced into engagement with ring 32.

The predetermined speed at which the resistance of the rotor is altered by removal of the shorting shoes 34 and 35 from engagement with the ring 32 is determined by the tension of the springs 53 and 54. One end of each spring is anchored to a stake 55 slidably carried by a lug or ear 56 provided by the leaf 45. That stake has a threaded end that receives a nut 57 thereon. The opposite end of each spring is secured to a stake 58 slidably carried by a lug 59 provided by the leaf 46. The outer end of the stake 58 is also threaded so as to receive a nut 60. The tension in the springs 53 and 54 is controlled by the position of the nuts 57 and 60 along the respective stakes 55 and 58. Tension is increased by threading the nuts farther onto the stakes, and is decreased by moving the nuts in the opposite direction. One adjusting means might be sufficient, but for manufacturing simplicity it is preferable to make the leaves 45 and 46 identical.

The modification illustrated in Figs. 4 and 5 comprises a rotor designated generally with the numeral 70, and its general construction and electrical characteristics are quite similar to those of the rotors heretofore described.

This rotor is mounted for rotation about a shaft 71 and is provided with a plurality of bars separated from each other by gaps. The bars in the rotor shown in Figs. 4 and 5 are electrically coupled by ring 72 provided with air spaces or slots 73 as before. The gaps 73 are adapted to be shorted across by individual shorting shoes or members 74 which are interior of the rotor periphery and are biased outwardly into engagement therewith by springs 75 which at one end seat thereagainst, and which at their other end seat on a projection 76 provided by a mounting member 77 rigidly secured to the shaft 71. The shorting element 74 is affixed to a pin 78 extending radially of the rotor 70 in alignment with the slots 73, and through an opening in the finger 76. The spring 75 slidably receives the pin 78, and the pin in turn is slidable with respect to the finger 76 and at its inner end is provided with a lateral extension 79 that constrains it within a cam slot 80 provided in a cam arm 81 carried by a governor element 82 which is keyed on the shaft 71 so as to prevent rotation thereof with respect thereto but is free to move longitudinally therealong. The longitudinal position of the governor element 82 is determined by the governor control element 83 which, in the illustration given, is seen to comprise an arcuate arm 84 pivotally mounted intermediate its ends on a shaft or pivot axis 85 extending between the spaced legs of the bifurcated end 86 of a bracket 87 fixed to the shaft 71. At its outer end the arm 84 is equipped with a weight 88, and at its inner end it is bifurcated to provide spaced legs 89 that receive an outwardly extending annular flange 90 provided by the governor element 82.

In operation of this form of the device, rotation of the rotor 70 results in the weights 88 tending to move outwardly along an axis normal to the rotational axis of the shaft 71 and through the pivot pins 85. Such movement will cause the inner end of the arm 84 to move toward the left as viewed in Fig. 5, whereupon the governor element 82 will be moved toward the left with respect to the shaft 71, and because of the inclination of the cam element 81, the pin 78 will be drawn inwardly and the shorting elements 74 will tend to be moved away from ring 72. Thus at some predetermined speed, the described movement will be sufficient to overcome the shorting across of the gaps 73.

The form of the invention shown in Figs. 6 and 7 again comprises a rotor for an induction motor having the same electrical characteristics. The rotor is designated generally with the numeral 100, and it is supported for rotation on a shaft 101, is equipped with the usual plurality of bars separated from each other by slots or gaps. The bars in the rotor shown are electrically coupled by means of a ring 102 provided with slots 103 extending partway thereacross. The slots 103 are adapted to be shorted across by a shorting shoe 104 in the form of a plate 105 having inwardly turned outer edge 106 adapted to engage the end of the ring 102 and thus bridge slots 103. The plate at its inner end is equipped with a hub 107 mounted on the shaft 101 for longitudinal movement therealong, but which is preferably keyed to the shaft so as to constrain the same against relative rotational movement.

Affixed to the shaft 101 by a pin 108 is a bracket 109 having bifurcated fingers 110 extending inwardly therefrom along the longitudinal axis of the shaft 101. Extending between the spaced prongs of the bifurcated fingers is a pivot pin 111 that provides a pivotal mounting for an angular arm 112 intermediate its ends. The arm 112 at its outer end carries a weight 113 and at its inner end is bifurcated to provide spaced legs 114 that receive a collar 115 therebetween carried by the hub 107 of the governor element or shorting shoe 104.

The arm 112 carries an apertured ear 116, and similarly, the member 109 carries an apertured ear 117 aligned therewith. A coil spring 118 extends between the two ears and has an end thereof hooked in each of the apertures. Therefore, the spring 118 provides a biasing force that tends to draw the weight 113 inwardly, whereby the shoe 104 is forced into engagement with the ends of the ring 102. It is apparent that the governor structure described, or more particularly the arm 112, weight 113, bifurcated finger 110, etc., has a counterpart diametrically opposite thereto, and since such counterpart structure is identical, no further description thereof will be set forth.

In operation of the embodiment illustrated in Figs. 6 and 7, the springs 118 bias the shorting shoes 104 against the ring 102 whereby the resistance of the rotor is relatively low. When the rotor is turning at a predetermined speed, centrifugal force will cause the weights 113 to move outwardly a sufficient amount so as to move the shorting shoe 104 toward the left along the shaft 101, whereby it will be separated from the ring 102 and the resistance of the rotor will then be increased to its maximum value.

Fig. 8 depicts several curves which have been compounded by plotting the torque of an induction motor against the speed thereof. It is clear from the labels employed in connection with the graph of Fig. 8 that the "$x$" axis designated torque and the "$y$" axis speed in revolutions per minute. The various curves, for purposes of identification, are designated with the numerals 120 through 123. The curves have been plotted for a predetermined operating voltage for the induction motor. The curve 120 shows the relationship of torque to rotor speed for a rotor having a normally low resistance. The curve 121 is for a rotor having high resistance. It is clear then by comparing the curves 120 and 121 that torque falls off more rapidly as rotor speed decreases, when the resistance of the rotor is high. As a result, it is apparent that speed control for the motor can be effectuated by decreasing the rotor resistance when the speed thereof tends to fall off.

The curve 122 shown in broken lines corresponds to the curve 120, but it is representative of the rotor speed-torque relationship at a lower operating voltage. The curves 123 and 121 have the same interrelationship—the curve 123 simply representing the lower operating voltage for a rotor having a high resistance. It will be noted that the torque drops off much more rapidly with a decrease in the operating voltage of the motor when the resistance of the rotor is high, than when the rotor resistance is low; and this relationship is graphically represented by the respective spacings between the curves 121, 123 and 120, 122.

To illustrate the manner in which change of resistance can provide speed control, line 124 is provided on Fig. 8 to show the torque requirements of a typical load which might be imposed upon a motor constructed in accordance with teachings of this invention. Ordinate $y_1$ shows the speed at which the rotor of the motor assumes a high resistance under the control of the governor mechanism. Ordinate $y_2$ shows the speed at which the rotor of the motor assumes a low resistance or operates in the short circuited condition under the control of the governor. The intersection of ordinate $y_1$ with line 124 establishes the maximum speed and torque as shown by abscissa $x_1$ which will be attained during the driving of this particular load. The intersection of ordinate $y_2$ with line 124 establishes abscissa $x_2$ and determines the minimum speed and torque which will occur.

Thus it is seen that the speed variation between ordinates $y_2$ and $y_1$ is maintained by the action of the governor mechanism and may be any amount desired depending upon the sensitivity of the governor. For example this sensitivity may range between 5 and 25 revolutions per minute. So long as the intersections of ordinates $y_1$ and $y_2$ with line 124 fall between lines 121 and 122 the governor has complete control over the speed of the motor driving this particular load.

The various embodiments of the invention heretofore described in detail exemplify a system for controlling the speed of an induction motor by decreasing rotor resistance when the speed thereof tends to fall below a predetermined value, and for increasing the resistance thereof when the speed attains such preselected value. Thus, the induction motor is made voltage-sensitive and voltage-insensitive as required in order to maintain a substantially constant operating speed therefor, whereby such motor is relatively independent of fluctuations in the operating voltage therefor. The control is effectuated in the low voltage circuit of the motor whereby there is no interference with other electrical apparatus and appliances in proximity therewith—radio and television receivers, for example; and further, there is but a minimum of burning and wearing of the shorting contacts. Simply as an indication of the low voltage employed, the potential between adjacent parts might be in the nature of about ½ volt.

In addition, there is no problem in the system disclosed of transferring mechanical motion from rotating to non-rotating parts since all of the mechanism used to effectuate the speed control is carried by the rotor. Furthermore, the system and the apparatus disclosed lends itself to adjustment whereby the motor speed may be made substantially synchronous at any preselected speed, and any desired degree of control sensitivity may be attained.

While in the foregoing specification embodiments of the invention have been described in considerable detail for purposes of making a complete disclosure thereof, it will be apparent to those skilled in the art that numerous changes may be made in those details without departing from the spirit and principles of the invention.

I claim:

1. In a speed control system for an induction motor, a rotor adapted to be rotated and being equipped with a plurality of conductors electrically coupled together by circular conductor means, said conductor means having spaced areas of low and high resistance, means for shunting said areas of high resistance to decrease the electrical resistance of said circular conductor means and hence said rotor, and means for removing said shunting means when the rotationable velocity of said rotor exceeds a predetermined value.

2. The system of claim 1 in which said last mentioned means comprises governor apparatus carried by said rotor operatively responsive to the velocity thereof.

3. In a speed control system of the character described for use in induction motors, a rotor for such motor having a plurality of conductor bars electrically operated from each other, circular conductor means for coupling said conductor together, said means having spaced portions of greater and less cross-sectional area, means for bridging the said portions of less cross-sectional area and governor means carried by said rotor and being connected with said last mentioned means for moving the same from bridging to unbridging position when said rotor exceeds a predetermined velocity.

4. The control system of claim 3 in which said circular conducting means is provided with air gaps extending partway therethrough to define portions of less cross-sectional area, and in which said bridging means comprises shorting members for bridging such gaps.

5. The speed control means of claim 3 in which said governor means is adjustable to afford selection of the predetermined rotor velocity at which said bridging means is shifted from one position to another.

6. In speed control apparatus for an induction motor having a rotor provided with conductors electrically coupled together with a partially slotted conducting ring, conductor shoes shiftable into engagement with said ring over a slotted portion thereof, means for urging said conductor shoes into engagement with said ring, and governor apparatus including said means and being connected with said conductor shoes for shifting the same out of contact with said ring when said rotor exceeds a predetermined rotational velocity.

7. The apparatus of claim 6 in which said governor apparatus comprises a plate carried by said rotor, a pin for each of said ring slots and connected to said plate, the respective conductor shoes being slidably mounted thereon, and a spring for each shoe biasing the same into engagement with said ring.

8. The apparatus of claim 7 in which said plate is adjustably rotatable with respect to said rotor and is provided with a plurality of angularly oriented cam slots, one for each of said pins, and in which each pin is slidably connected to said plate through a cam slot therefor, each spring being secured to a pin at one end and bearing against the conductor shoe at its other end to urge it toward contact with said ring.

9. The apparatus of claim 6 in which said governor apparatus comprises a pin for each of said conducting shoes to slidably receive the same thereon, a spring for each of said conducting shoes urging the same into engagement with said ring, a governor control member longitudinally movable with respect to the rotational axis of said rotor and having an inclined cam slot for each of said pins whereby each pin and the conducting shoe mounted thereon is moved toward and away from said ring upon lonigtudinal movement of said governor control member, and flyweights carried by said rotor and being operatively connected with said governor member for shifting the same longitudinally in accordance with the rotational velocity of said rotor.

10. The apparatus of claim 6 in which said conducting shoes are elongated arcuately for bridging a plurality of slots in said ring, in which weight-equipped governor control elements are pivotally connected intermediate the ends thereof to said rotor and are pivotally connected at an end thereof to said conductor shoes, and in which spring means are employed to normally bias said governor control elements into a position in which said conducting shoes are in contact with said ring.

11. The apparatus of claim 6 in which a unitary conducting shoe is provided for engagement with the end of said ring and is shiftable longitudinally with respect to the rotational axis of said rotor for selective engagement with said ring in which governor weights are carried by said rotor and are coupled with said unitary conducting shoe for establishing the position thereof, and in which spring means are provided for urging said governor weights into a position in which said unitary conducting shoe is in engagement with said ring.

References Cited in the file of this patent

UNITED STATES PATENTS

| 1,002,837 | Gray | Sept. 12, 1911 |
| 1,518,952 | Arutunoff | Dec. 9, 1924 |
| 2,748,333 | Lee | May 29, 1956 |